(12) United States Patent
Zhou

(10) Patent No.: US 11,496,380 B2
(45) Date of Patent: Nov. 8, 2022

(54) NETWORK DELAY CONTROL METHOD AND APPARATUS, ELECTRONIC DEVICE, AND STORAGE MEDIUM

(71) Applicant: BEIJING DAJIA INTERNET INFORMATION TECHNOLOGY CO., LTD., Beijing (CN)

(72) Inventor: Chao Zhou, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 164 days.

(21) Appl. No.: 15/733,878

(22) PCT Filed: Feb. 25, 2020

(86) PCT No.: PCT/CN2020/076608
§ 371 (c)(1),
(2) Date: Nov. 30, 2020

(87) PCT Pub. No.: WO2020/211535
PCT Pub. Date: Oct. 22, 2020

(65) Prior Publication Data
US 2021/0226873 A1    Jul. 22, 2021

(30) Foreign Application Priority Data
Apr. 15, 2019 (CN) .................. 201910300661.9

(51) Int. Cl.
*H04L 43/0852* (2022.01)
*H04L 47/11* (2022.01)

(52) U.S. Cl.
CPC .......... *H04L 43/0852* (2013.01); *H04L 47/11* (2013.01)

(58) Field of Classification Search
CPC ... H04L 43/0852; H04L 47/11; H04L 43/087; H04L 43/16; H04L 47/12; H04L 47/283; H04L 43/0858
See application file for complete search history.

(56) References Cited

U.S. PATENT DOCUMENTS

| 2015/0188825 | A1  | 7/2015 | Gunduzhan |            |
|--------------|-----|--------|-----------|------------|
| 2020/0236038 | A1* | 7/2020 | Liu       | H04L 41/0836 |
| 2021/0218629 | A1* | 7/2021 | Wei       | H04L 67/1031 |

FOREIGN PATENT DOCUMENTS

| CN | 1487698 A   | 4/2004 |
|----|-------------|--------|
| CN | 101150521 A | 3/2008 |

(Continued)

OTHER PUBLICATIONS

Chinese Office Action from CN 201910300661.9 dated Jun. 3, 2020 (5 pages).

(Continued)

*Primary Examiner* — Khaled M Kassim
*Assistant Examiner* — Najeeb Ansari
(74) *Attorney, Agent, or Firm* — Foley & Lardner LLP

(57) ABSTRACT

The present application provides a network delay control method and apparatus, an electronic device, and a storage medium. A current end-to-end network delay type is determined, then a proper strategy is adopted according to the determination result. For example, when the determination result is the network inherent delay, the sending speed of the sending end can be kept or increased, the sending speed of the sending end is prevented from being reduced, and the network transmission efficiency is ensured. When the determination result is the network congestion delay, the sending speed of the sending end can be reduced, and the delay is reduced.

15 Claims, 4 Drawing Sheets

--- determining a type of network delay when the first data packet is received according to the first data volume, the delay duration of the first data packet, and the receiving rate so as to obtain a preliminary determination result — S201 storing the preliminary determination result into a determination set, wherein the determination set comprises a preliminary determination result of a type of network delay when a fourth data packet is received by the receiving end, wherein the fourth data packet is received before the first data packet is received — S202 when the number of preliminary determination results in the determination set is greater than or equal to a first preset threshold, calculating a ratio of the number of the preliminary determination results as the inherent delay to a total number of preliminary determination results in the determination set, and determining the type of network delay according to the ratio — S203 when the number of preliminary determination results in the determination set is less than the first preset threshold, determining the type of network delay as the congestion delay — S204

(56) References Cited

FOREIGN PATENT DOCUMENTS

| CN | 101522592 A | 9/2009 |
|---|---|---|
| CN | 102263605 A | 11/2011 |
| CN | 103873387 A | 6/2014 |
| CN | 103973587 A | 8/2014 |
| CN | 104243090 A | 12/2014 |
| CN | 105357138 A | 2/2016 |
| CN | 106094794 A | 11/2016 |
| CN | 107734537 | 2/2018 |
| CN | 109474538 A | 3/2019 |
| CN | 110120896 A | 8/2019 |
| WO | WO-2009/146726 A8 | 12/2009 |
| WO | WO-2015/161990 A | 10/2015 |

OTHER PUBLICATIONS

International Search Report from PCT/CN2020/076608 dated May 27, 2020 (5 pages).
Chinese Notice of Allowance dated Nov. 27, 2020, from application serial No. 201910300661.9, 3 pages.

* cited by examiner ural block diagram of an apparatus for controlling network delay shown in the present application;

NETWORK DELAY CONTROL METHOD AND APPARATUS, ELECTRONIC DEVICE, AND STORAGE MEDIUM

CROSS REFERENCES TO RELATED APPLICATIONS

The present application is based on International Application No. PCT/CN2020/076608, filed on Feb. 25, 2020, which is based on and claims the priority from Chinese Patent Application No. 201910300661.9, filed with the Chinese Patent Office on Apr. 15, 2019, and entitled "METHOD AND APPARATUS FOR CONTROLLING NETWORK DELAY, ELECTRONIC DEVICE AND STORAGE MEDIUM", which is hereby incorporated by reference in its entirety.

TECHNICAL FIELD

The present application relates to the field of computer technologies, and in particular to a method and an apparatus for controlling network delay, an electronic device and a storage medium.

BACKGROUND

A change in a network status directly affects quality of network transmission. Therefore, an accurate estimation of the network status is essential for improving the quality of network transmission. The estimation of the network status generally includes three dimensions: estimation of network bandwidth, estimation of network transmission packet loss rate, and estimation of network delay. Under different network statuses, adopted optimization strategies are also different. The network delay is affected by many factors, which can be simply divided into network queuing delay caused by network congestion and inherent delay caused by non-network congestion.

For the network queuing delay caused by the network congestion, the delay is mainly reduced by efficient congestion control strategies; for the inherent delay caused by the non-network congestion, the efficient congestion control strategies will not have any effect. Therefore, an inventor believes that how to determine whether current end-to-end delay is caused by the network congestion or the inherent delay of the network is particularly important for controlling the end-to-end delay in systems with extremely high delay requirements such as real-time audio and video communications.

SUMMARY

The present application provides a method and an apparatus for controlling network delay, an electronic device and a storage medium.

According to a first aspect of the present application, there is provided a method for controlling network delay. The method includes in response to determining that a first data packet sent by a sending end is received by a receiving end, recording a receiving time of the first data packet, acquiring a sending time of the first data packet at the sending end, and determining a delay duration of the first data packet according to the receiving time and the sending time. The method includes determining a receiving speed of the first data packet at the receiving end. The method includes determining first data volume according to a plurality of second data packets received by the receiving end. The second data packets are sent by the sending end after sending the first data packet, and before the first data packet is received by the receiving end. The method includes determining a type of the network delay according to the first data volume, the delay duration of the first data packet, and the receiving speed. The type of the network delay is inherent delay or congestion delay. The method includes sending a determination result or an adjustment instruction generated according to the determination result to the sending end, so that the sending end adjusts a sending rate.

According to a second aspect of the present application, there is provided an apparatus for controlling network delay. The apparatus includes a first acquiring module configured to, when a first data packet sent by a sending end is received by a receiving end, record a receiving time of the first data packet, acquire a sending time of the first data packet at the sending end, and determine a delay duration of the first data packet according to the receiving time and the sending time. The apparatus includes a second acquiring module, configured to determine a receiving speed of the first data packet at the receiving end. The apparatus includes a third acquiring module, configured to determine first data volume according to a plurality of second data packets received by the receiving end. The second data packets are sent by the sending end after sending the first data packet, and before the first data packet is received by the receiving end. The apparatus includes a determining module, configured to determine a type of the network delay according to the first data volume, the delay duration of the first data packet, and the receiving speed. The type of the network delay is inherent delay or congestion delay. The apparatus includes a sending module, configured to send a determination result or an adjustment instruction generated according to the determination result to the sending end, so that the sending end adjusts a sending rate.

According to a third aspect of the present application, there is provided an electronic device. The electronic device includes a processor and a memory for storing processor executable instructions. The processor is configured to execute the method for controlling network delay as described in the first aspect.

According to a fourth aspect of the present application, there is provided a non-transitory computer-readable storage medium. Instructions in the storage medium are executed by a processor of an electronic device, which causes the electronic device to execute the method for controlling network delay as described in the first aspect.

According to a fifth aspect of the present application, there is provided a computer program product. Instructions in the computer program product are executed by a processor of an electronic device, which causes the electronic device to execute the method for controlling network delay as described in the first aspect.

DETAILED DESCRIPTION

In the existing scheme, jitter caused by network delay is generally attributed to network congestion, that is, a sending rate is greater than a receiving rate, which causes data to accumulate in the network and causes queuing delay. As for the network delay caused by the network congestion, an efficient congestion control algorithm is designed to control the sending rate to reduce the network queuing delay. In an actual system, jitter of end-to-end network delay is not entirely caused by the network queuing delay, but may also be caused by inherent network delay. For jitter caused by the inherent network delay, reducing the sending rate by the congestion control algorithm not only cannot reduce the end-to-end delay, but will reduce the utilization of network bandwidth.

Figure 1:
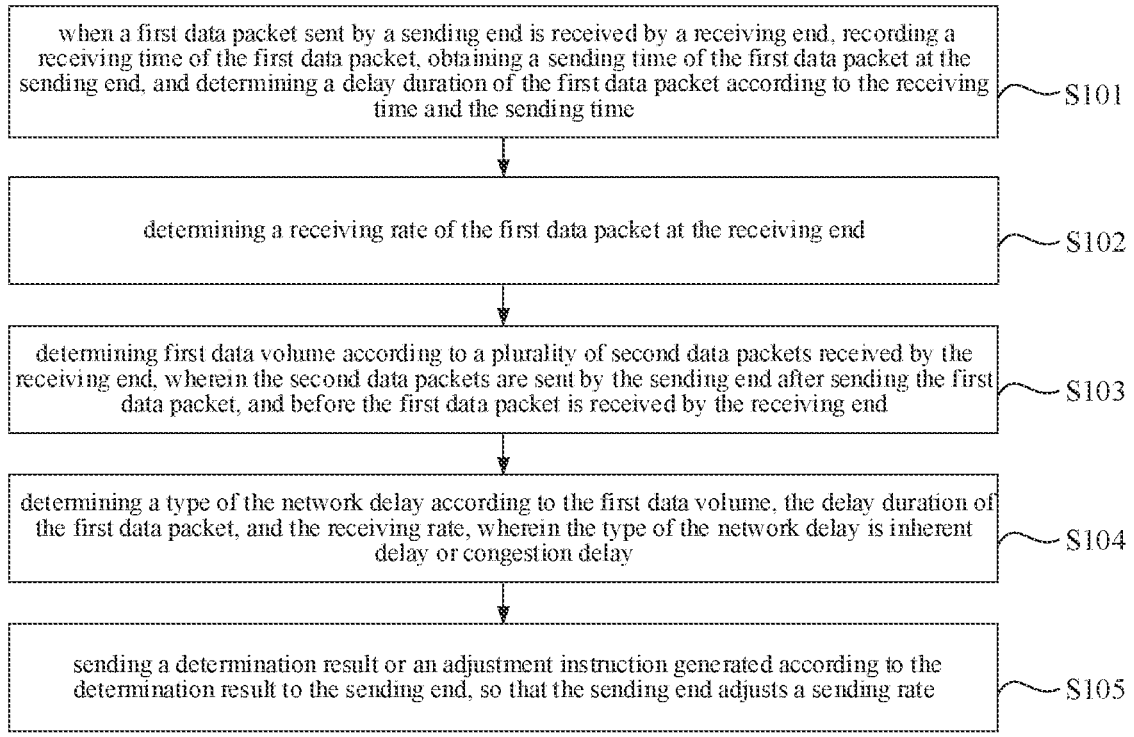
FIG. 1 is a flowchart of steps of a method for controlling network delay shown in the present application.

In order to solve the above problems, FIG. 1 shows a method for controlling network delay provided by an arrangement of the present application. The method can be applied to an end-to-end transmission system including a sending end and a receiving end. The sending end sends media data to the receiving end, and the receiving end or a server end determines a type of current network delay as inherent delay or congestion delay by collecting network data. The method includes the following blocks.

In block S101, in response to determining that the receiving end receives a first data packet sent by the sending end, a receiving time of the first data packet is recorded, a sending time of the first data packet at the sending end is obtained, and a delay duration of the first data packet is determined according to the receiving time and the sending time.

In an actual process, before block S101, it may further include performing time calibration on the sending end and the receiving end. In some arrangements, the sending end and the receiving end can perform clock time calibration by any strategy such as a network time protocol (NTP) to ensure that clocks of the sending end and the receiving end are synchronized.

A header of each data packet can carry the sending time of the sending end. When (in response to determining that) the receiving end receives the first data packet (numbered n), a first acquiring module 301 can read the sending time $t_n^s$ of the first data packet n from the header of the first data packet n, and record the receiving time $t_n^r$ of the first data packet at the receiving end.

The delay duration $delay_n$ can be determined by the difference between the receiving time $t_n^r$ and the sending time $t_n^s$ of the first data packet; it can also be determined according to receiving times and sending times of a preset number W of data packets received before receiving the first data packet by the receiving end. For example, the delay duration can be calculated according to the following formula:

$$delay_n = \frac{1}{W} \sum_{i=n-W+1}^{n} (t_i^r - t_i^s)$$

where the preset number W may be determined according to actual conditions, and may take a value of 5-10, for example; $t_i^s$ is a sending time of any data packet i in the W data packets at the sending end, and $t_i^r$ is a receiving time of any data packet i in the W data packets at the receiving end. The delay duration determined in the second manner is an average delay duration of the preset number of data packets, which can eliminate influence of errors in the delay duration of a single data packet caused by factors such as network instability and improve accuracy of network delay determination.

In block S102, a receiving speed of the first data packet at the receiving end is determined.

The header of each data packet may also carry data volume of the data packet. For example, the data volume of the first data packet n may be expressed as $s_n$.

In practical applications, the receiving speed $r_n^{recv}$ can be determined according to the first data packet received by the receiving end, according to a quotient of the data volume $s_n$ of the first data packet and a receiving duration. The receiving speed $r_n^{recv}$ can also be determined according to a plurality of third data packets received by the receiving end. The plurality of third data packets are received within a preset time period T before the first data packet is received at the receiving end, which can be calculated according to the following formula:

$$r_n^{recv} = \frac{\sum s_k}{T} \text{ s.t. } t_n^r - t_k^r \leq T \text{ \& } k \leq n$$

where k is a number of a third data packet received within the preset time period T by the receiving end before the first data packet is received. $s_k$ is data volume of a third data packet k; $\Sigma s_k$ represents total data volume of the plurality of third data packets k received within the preset time period T.

In a constraint condition (s.t.), $tk^r$ is the receiving time of the third data packet k, $t_n^r - t_k^r \leq T$ means that the third data packet k is received within the preset time period T before the first data packet n is received by the receiving end, that is, the receiving time $t_k^r$ of the third data packet k is earlier than or equal to the receiving time $t_n^r$ of the first data packet n, and later than or equal to a preset time point $t_n^r - T$ before the first data packet n is received. $k \leq n$ indicates that the third data packet k is sent/received before the first data packet n, and the third data packet may include the first data packet. The receiving end or the server end can store packet information of each data packet (such as the third data packet k) received in history, such as the sending time $t_k^s$, the receiving time $t_k^r$ of each data packet, and the data volume $s_k$ of the data packet, or the like.

In the practical applications, a specific value of the preset duration T is determined according to actual conditions, which may be greater than or equal to 500 ms, for example, may be 1s.

The total data volume $\Sigma s_k$ received within the preset duration T is divided by the preset duration T to obtain the average receiving speed of the receiving end when (in response to determining that) the first data packet is received. The receiving speed of the first data packet determined in this way is the average receiving speed of the receiving end within the preset time period, which can eliminate influence of errors in the receiving speed calculated by a single data packet caused by factors such as network instability, and further improve accuracy of network delay determination.

In block S103, the first data volume is determined according to a plurality of second data packets received by the receiving end, and the second data packets are sent by the sending end after sending the first data packet, and before the first data packet is received by the receiving end.

In some arrangements, when (in response to determining that) the receiving end receives the first data packet n, the first data volume inflight$_n$ at this time can be calculated by the following formula:

$$\text{inflight}_n = \Sigma s_h, \text{s.t. } h \geq n \text{ \& } t_h^s \leq t_n^r$$

where the first data volume inflight$_n$ represents a sum (that is, $\Sigma s_h$) of the data volume of the second data packets h being transmitted between the sending end and the receiving end when the receiving end receives the first data packet.

In the constraint condition (s.t.), h≥n means that the second data packet h is sent after the first data packet n is sent by the sending end, that is, the sending time $t_h^s$ of the second data packet h is later than or equal to the sending time $t_n^s$ of the first data packet n. $t_h^s \leq t_n^r$ means that the second data packet h is sent before the receiving end receives the first data packet n, that is, the sending time $t_h^s$ of the second data packet h is earlier than or equal to the receiving time $t_n^r$ of the first data packet n. It should be noted that the second data packet h may include the first data packet n.

In block S104, a type of the network delay is determined according to the first data volume, the delay duration of the first data packet, and the receiving speed, and the type of the network delay is inherent delay or congestion delay.

There are many ways to implement block S104. In one implementation, the type of network delay when (in response to determining that) the first data packet is received can be first determined, and the type of current network delay is directly determined based on a preliminary determination result of the network delay when (in response to determining that) the first data packet is received. In another implementation, the type of network delay when (in response to determining that) the first data packet is received can be first determined, and the preliminary determination result of the network delay when (in response to determining that) the first data packet is received is stored into the determination set, and the determination set includes preliminary determination results of the network delay when (in response to determining that) the plurality of received data packets were received, and then the type of network delay is determined according to a ratio of the number of the preliminary determination results as the inherent delay to the number of preliminary determination results in the determination set. Subsequent arrangements will introduce the second implementation in detail.

The type of network delay when (in response to determining that) the first data packet is received can be determined in the following manner. It is first determined whether the first data volume inflight$_n$, the delay duration delay$_n$ of the first data packet, and the receiving speed $r_n^{recv}$ satisfy an inequality: $(\text{delay}_n - \Delta) * r_n^{recv} \geq \text{inflight}_n$, where $\Delta$ is a second preset threshold. When (in response to determining that) the inequality holds, it is determined that the preliminary determination result of the type of network delay when the first data packet is received is the inherent delay; when (in response to determining that) the inequality does not hold, it is determined that the preliminary determination result of the type of network delay when (in response to determining that) the first data packet is received is the congestion delay.

A specific value of the second preset threshold $\Delta$ can be determined according to actual conditions, for example, it can be set to 50 ms. The influence of a calculation error of delay$_n$ can be eliminated by setting the second preset threshold reasonably.

In block S105, a determination result or an adjustment instruction generated according to the determination result is sent to the sending end according to the determination result, so that the sending end adjusts a sending rate.

In some arrangements, if the determination result is the inherent delay, the determination result or the adjustment instruction generated according to the determination result is sent to the sending end, so that the sending end can maintain or increase the sending rate; if the determination result is the congestion delay, the determination result or the adjustment instruction generated according to the determination result is sent to the sending end, so that the sending end can reduce the sending rate.

In this way, first, the type of network delay is dynamically determined, and then an appropriate strategy is adopted. For example, if the determination result is the inherent network delay, reducing the sending rate will not improve the delay at this time, so the sending end can keep the sending rate unchanged or increase the sending rate to avoid unnecessary reduction of the sending rate and ensure the network transmission efficiency; if the determination result is the congestion network delay, at this time, the sending end can reduce the sending rate to avoid the congestion to reduce the delay.

In the method for controlling the network delay provided by the arrangement, by determining the current end-to-end network delay type, an appropriate strategy is adopted according to the determination result. For example, when (in response to determining that) the determination result is the inherent network delay, the sending speed of the sending end can be maintained or increased to avoid reducing the sending speed of the sending end to ensure network transmission efficiency; when (in response to determining that) the determination result is the congestion network delay, the sending speed of the sending end can be reduced to reduce the delay. The technical solutions of the present application can avoid the problem of reducing the sending rate by the congestion control algorithm when (in response to determining that) the inherent network delay occurs, which not only cannot reduce the end-to-end delay, but will reduce the network bandwidth utilization rate.

Figure 2:
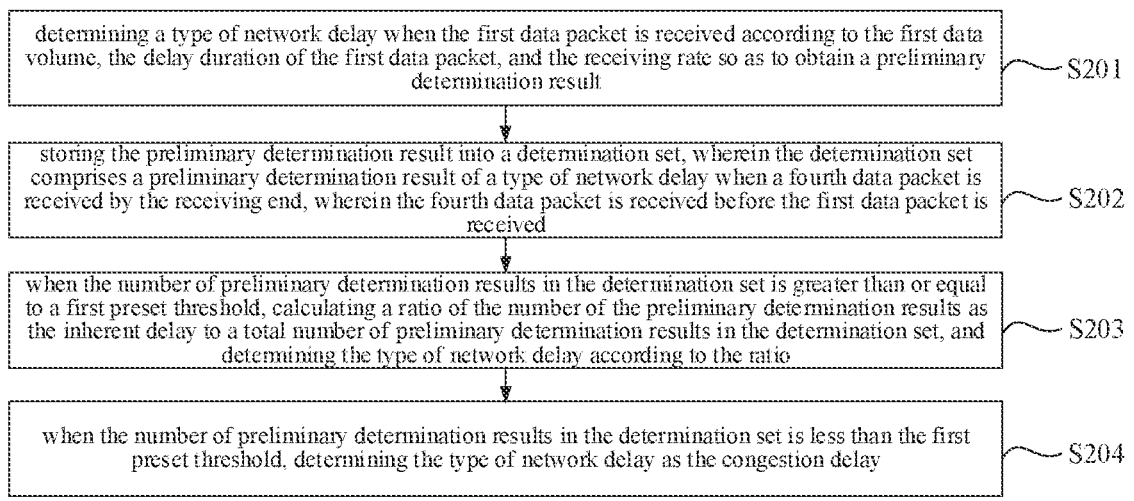
FIG. 2 is a flowchart of a determination method shown in the present application.

In an implementation, referring to FIG. 2, block S103 may include the following blocks.

In block S201, a type of network delay when (in response to determining that) the first data packet is received is determined according to the first data volume, the delay duration of the first data packet, and the receiving speed, so as to obtain the preliminary determination result.

The specific determination manner can refer to the description in block 104. The preliminary determination result is that the type of network delay when (in response to determining that) the first data packet is received is the inherent delay or the congestion delay.

In block S202, the preliminary determination result is stored into the determination set, and the determination set includes a preliminary determination result of a type of network delay when (in response to determining that) a fourth data packet is received by the receiving end. The fourth data packet is received before the first data packet is received.

In some arrangements, each time the receiving end receives the data packet, the preliminary determination result of the network delay type when (in response to determining that) the data packet is received can be obtained, and the preliminary determination results corresponding to these data packets are stored in the determination set, and the number of data packets received by the receiving end is the same as the number of preliminary determination results in the determination set.

In block S203, when (in response to determining that) the number of preliminary determination results in the determination set is greater than or equal to a first preset threshold, a ratio of the number of the preliminary determination results as the inherent delay to a total number of preliminary determination results in the determination set is calculated, and the type of network delay is determined according to the ratio.

The first preset threshold may be determined according to actual statistical needs. By setting the first preset threshold reasonably, the preliminary determination result in the determination set can be made statistically significant. For example, the first preset threshold may be set to 10.

When (in response to determining that) the number of preliminary determination results in the determination set is greater than or equal to the first preset threshold, the ratio $\eta$ of the number of the preliminary determination results as the inherent delay to the total number of preliminary determination results in the determination set can be further calculated.

In some arrangements, the block of determining the type of network delay according to the ratio $\eta$ may include: when (in response to determining that) the ratio $\eta$ is greater than or equal to a third preset threshold, it is determined that the type of the network delay is the inherent delay; when (in response to determining that) the ratio $\eta$ is less than the third preset threshold, it is determined that the type of network delay is the congestion delay.

The third preset threshold may be a constant value greater than 0 and less than or equal to 1, for example, 0.6.

By setting the third preset threshold, it is possible to exclude the influence of inaccurate preliminary determination results caused by factors such as network instability for individual data packets.

In block S204, when (in response to determining that) the number of preliminary determination results in the determination set is less than the first preset threshold, it is determined that the type of network delay is the congestion delay.

When (in response to determining that) the number of preliminary determination results in the determination set is insufficient, the determination error is relatively large. When it is determined as (in response to determining) the inherent network delay, the sending rate is generally not reduced; when it is determined as (in response to determining) the congestion delay, the speed is generally reduced. Therefore, when (in response to determining that) the determination error is large, a conservative strategy can be adopted, that is, it is determined as the congestion delay, and the sending rate is conservatively adjusted to avoid the negative impact caused by the congestion delay.

In this way, the network delay type is determined according to the plurality of preliminary determination results in the determination set, which can eliminate the misjudgment caused by the inaccurate single preliminary judgment result, and further improve the accuracy of the network delay determination.

Figure 3:
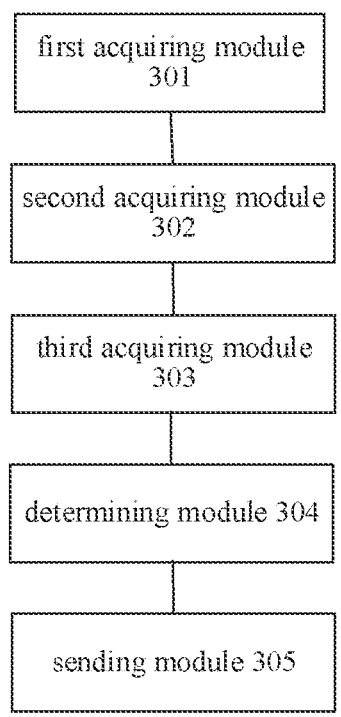
FIG. 3 is a structural block diagram of an apparatus for controlling network delay shown in the present application.

FIG. 3 is a block diagram of an apparatus for controlling network delay shown in the present application. Referring to FIG. 3, the apparatus may include:

a first acquiring module 301, configured to, when (in response to determining that) a first data packet sent by a sending end is received by a receiving end, record a receiving time of the first data packet, acquire a sending time of the first data packet at the sending end, and determine a delay duration of the first data packet according to the receiving time and the sending time.

In practical applications, the apparatus for controlling network delay provided in this arrangement may further include a time calibration module, configured to perform time calibration on the sending end and the receiving end. In some arrangements, the time calibration module is configured to perform clock time calibration on the sending end and the receiving end by any strategy such as a network time protocol (NTP) to ensure that clocks of the sending end and the receiving end are synchronized.

A header of each data packet can carry the sending time of the sending end. When (in response to determining that) the receiving end receives the first data packet (numbered n), a first acquiring module 301 can read the sending time $t_n^s$ of the first data packet n from the header of the first data packet n, and record the receiving time $t_n^r$ of the first data packet at the receiving end.

The delay duration $delay_n$ can be determined by the difference between the receiving time $t_n^r$ and the sending time $t_n^s$ of the first data packet; it can also be determined according to receiving times and sending times of a preset number W of data packets received before receiving the first data packet by the receiving end. For example, the delay duration can be calculated according to the following formula:

$$delay_n = \frac{1}{W} \sum_{i=n-W+1}^{n} (t_i^r - t_i^s)$$

where the preset number W may be determined according to actual conditions, and may take a value of 5-10, for example; $t_i^s$ is a sending time of any data packet i in the W data packets at the sending end, and $t_i^s$ a receiving time of any data packet i in the W data packets at the receiving end. The delay duration determined in the second manner is an average delay duration of the preset number of data packets, which can eliminate influence of errors in the delay duration of a single data packet caused by factors such as network instability and improve accuracy of network delay determination.

A second acquiring module 302 is configured to determine a receiving speed of the first data packet at the receiving end.

The header of each data packet may also carry data volume of the data packet. For example, the data volume of the first data packet n may be expressed as $s_n$.

In some arrangements, the second acquiring module 302 may determine the receiving speed $r_n^{recv}$ according to the first data packet received by the receiving end, for example, according to the receiving duration and the data volume $s_n$ of the first data packet; the second acquiring module 302 may also determine the receiving speed $r_n^{recv}$ according to a plurality of third data packets received by the receiving end. The plurality of third data packets are received within a preset time period T before the first data packet is received at the receiving end, which can be calculated according to the following formula:

$$r_n^{recv} = \frac{\sum s_k}{T} \text{ s.t. } t_n^r - t_k^r \leq T \& k \leq n$$

where k is a number of a third data packet received within the preset time period T by the receiving end before the first data packet is received. $s_k$ is data volume of a third data packet k; $\Sigma s_k$ represents total data volume of the plurality of third data packets k received within the preset time period T.

In a constraint condition (s.t.), $t_k^r$ is the receiving time of the third data packet k, $t_n^r - t_k^r \leq T$ means that the third data packet k is received within the preset time period T before the first data packet n is received by the receiving end, that is, the receiving time $t_k^r$ of the third data packet k is earlier than or equal to the receiving time $t_n^r$ of the first data packet n, and later than or equal to a preset time point $t_n^r$-T before the first data packet n is received. k≤n indicates that the third data packet k is sent/received before the first data packet n, and the third data packet may include the first data packet. The receiving end can store packet information of each data packet (such as the third data packet k) received in history, such as the sending time $t_k^s$, the receiving time $t_k^r$ of each data packet, and the data volume $s_k$ of the data packet, or the like.

In the practical applications, a specific value of the preset duration T is determined according to actual conditions, which may be greater than or equal to 500 ms, for example, may be 1s.

The total data volume $\Sigma s_k$ received within the preset duration T is divided by the preset duration T to obtain the average receiving speed of the receiving end when (in response to determining that) the first data packet is received. The receiving speed of the first data packet determined in this way is the average receiving speed of the receiving end within the preset time period, which can eliminate influence of errors in the receiving speed calculated by a single data packet caused by factors such as network instability, and further improve accuracy of network delay determination.

A third acquiring module 303 is configured to determine the first data volume according to a plurality of second data packets received by the receiving end, and the second data packets are sent by the sending end after sending the first data packet, and before the first data packet is received by the receiving end.

In some arrangements, when (in response to determining that) the receiving end receives the first data packet n, the first data volume inflight$_n$ at this time can be calculated by the third acquiring module 303 through the following formula:

$$\text{inflight}_n = \Sigma s_h, \text{s. t. } h \geq n \ \& \ t_h^s \leq t_n^r$$

where the first data volume inflight$_n$ represents a sum (that is, $\Sigma s_h$) of the data volume of the second data packets h being transmitted between the sending end and the receiving end when (in response to determining that) the receiving end receives the first data packet.

In the constraint condition (s.t.), h≥n means that the second data packet h is sent after the first data packet n is sent by the sending end, that is, the sending time $t_h^s$ of the second data packet h is later than or equal to the sending time $t_n^s$ of the first data packet n. $t_h^s \leq t_n^r$ means that the second data packet h is sent before the receiving end receives the first data packet n, that is, the sending time $t_h^s$ of the second data packet h is earlier than or equal to the receiving time $t_n^r$ of the first data packet n. It should be noted that the second data packet h may include the first data packet n.

The determining module 304 is configured to determine the type of network delay according to the first data volume, the delay duration of the first data packet, and the receiving speed, and the type of the network delay is inherent delay or congestion delay.

In some arrangements, there are multiple implementation manners for the determining module 304 to determine the type of network delay. In one implementation, the type of network delay when (in response to determining that) the first data packet is received can be first determined, and the type of current network delay is directly determined based on a preliminary determination result of the network delay when (in response to determining that) the first data packet is received. In another implementation, the type of network delay when (in response to determining that) the first data packet is received can be first determined, and the preliminary determination result of the network delay when (in response to determining that) the first data packet is received is stored into the determination set, and the determination set includes preliminary determination results of the network delay when (in response to determining that) the plurality of received data packets were received, and then the type of network delay is determined according to a ratio of the number of the preliminary determination results as the inherent delay to the number of preliminary determination results in the determination set. Subsequent arrangements will introduce the second implementation in detail.

The type of network delay when (in response to determining that) the first data packet is received can be determined in the following manner. It is first determined whether the first data volume inflight$_n$, the delay duration delay$_n$ of the first data packet, and the receiving speed $r_n^{recv}$ satisfy an inequality: $(\text{delay}_n - \Delta) * r_n^{recv} \geq \text{inflight}_n$, where $\Delta$ is a second preset threshold. When (in response to determining that) the inequality holds, it is determined that the preliminary determination result of the type of network delay when (in response to determining that) the first data packet is received is the inherent delay; when (in response to determining that) the inequality does not hold, it is determined that the preliminary determination result of the type of network delay when (in response to determining that) the first data packet is received is the congestion delay.

The second preset threshold $\Delta$ is the delay threshold, and the specific data can be determined according to actual conditions, for example, it can be set to 50 ms. When (in response to determining that) the delay duration is less than the second preset threshold, the end-to-end delay is quite small and can be ignored; when (in response to determining that) the delay duration is greater than or equal to the second preset threshold, the type of network delay can be further determined.

The sending module 305 is configured to send a determination result or an adjustment instruction generated according to the determination result to the sending end, so that the sending end can adjust the sending rate.

In some arrangements, the sending module 305 is also configured to, if the determination result is the inherent delay, send the determination result or the adjustment instruction generated according to the determination result to the sending end, so that the sending end can maintain or increase the sending rate; if the determination result is the congestion delay, send the determination result or the adjustment instruction generated according to the determination result to the sending end, so that the sending end can reduce the sending rate.

In an optional implementation, the second acquiring module 302 is further configured to:

determine second data volume according to a plurality of third data packets received by the receiving end, the plurality of third data packets being received within a preset duration before the first data packet is received by the receiving end; and determine the receiving speed according to the second data volume and the preset duration.

In an optional implementation, the determining module 304 includes a preliminary determination unit configured to determine a type of network delay, when the first data packet is received according to the first data volume, the delay duration of the first data packet, and the receiving speed, so as to obtain a preliminary determination result. The determining module 304 includes a storing set unit, configured to store the preliminary determination result into a determination set. The determination set includes a preliminary determination result of a type of network delay when (in response to determining that) a fourth data packet is received by the receiving end, wherein the fourth data packet is received before the first data packet is received. The determining module 304 includes a first determination unit configured to, when (in response to determining that) the number of preliminary determination results in the determination set is greater than or equal to a first preset threshold, calculate a ratio of the number of the preliminary determination results as the inherent delay to a total number of preliminary determination results in the determination set, and determine the type of network delay according to the ratio. The determining module 304 includes a second determination unit configured to, when (in response to determining that) the number of preliminary determination results in the determination set is less than the first preset threshold, determine the type of network delay as the congestion delay.

In this implementation, the preliminary determination unit is further configured to determine whether the first data volume $inflight_n$, the delay duration $delay_n$ of the first data packet, and the receiving speed $r_n^{recv}$ satisfy an inequality: $(delay_n-\Delta)*r_n^{recv} \geq inflight_n$, where $\Delta$ is a second preset threshold. When (in response to determining that) the inequality holds, the preliminary determination unit is further configured to determine that the preliminary determination result of the type of network delay when (in response to determining that) the first data packet is received is the inherent delay. When (in response to determining that) the inequality does not hold, the preliminary determination unit is further configured to determine that the preliminary determination result of the type of network delay when the first data packet is received is the congestion delay.

In this implementation, the first determining unit is further configured to when (in response to determining that) the ratio is greater than or equal to a third preset threshold, determine the type of network delay as the inherent delay. The first determining unit is further configured to when (in response to determining that) the ratio is less than the third preset threshold, determine the type of network delay as the congestion delay.

Regarding the apparatus in the above arrangements, the specific manners and beneficial effects of operations performed by each module therein have been described in detail in the arrangements related to the method, and detailed description will not be given here.

Figure 4:
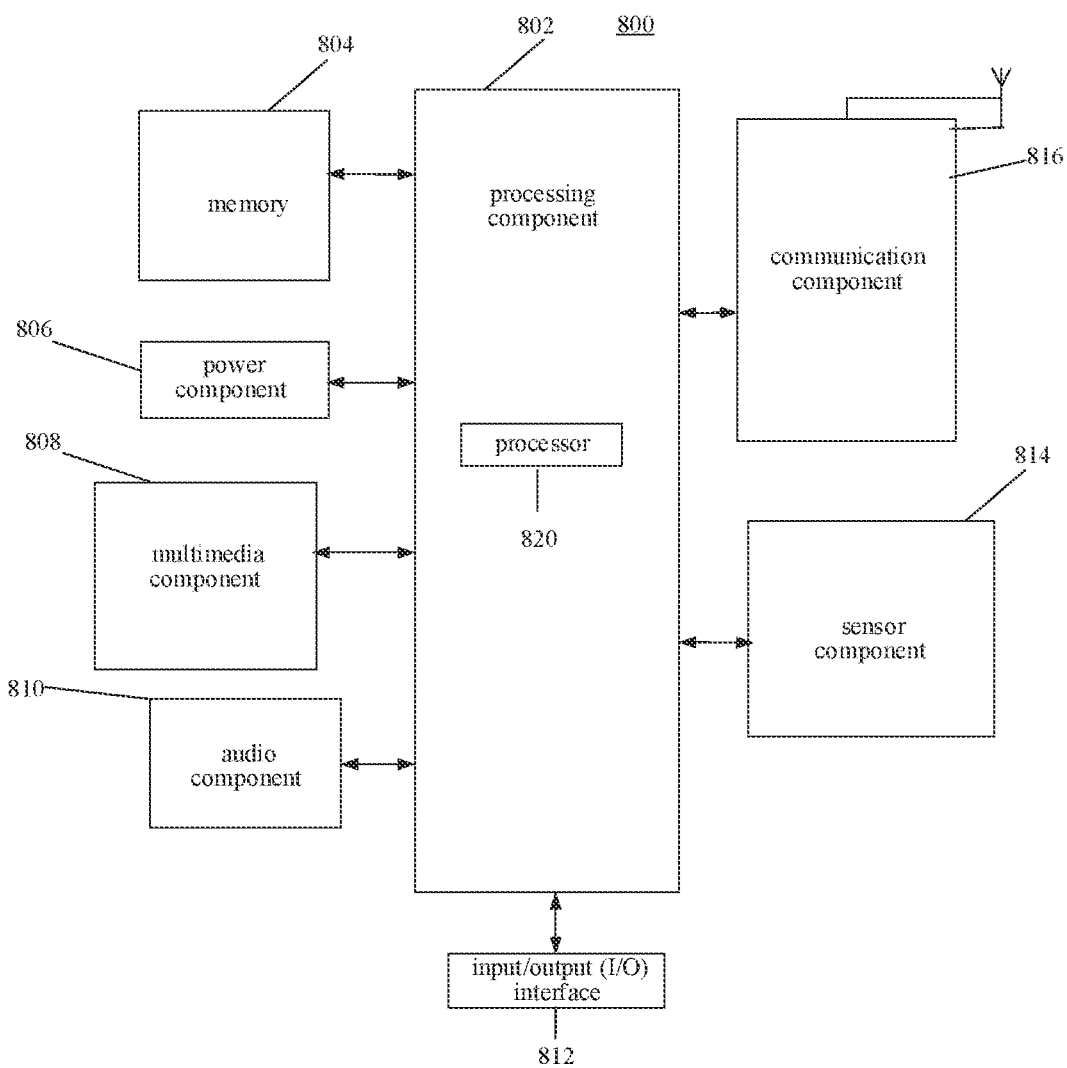
FIG. 4 is a block diagram of an electronic device shown in the present application.

FIG. 4 is a block diagram of an electronic device 800 shown in the present application. For example, the electronic device 800 may be a mobile phone, a computer, a digital broadcasting terminal, a messaging device, a game console, a tablet device, a medical device, a fitness device, a personal digital assistant, or the like.

Referring to FIG. 4, the electronic device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operations of the electronic device 800, such as the operations associated with display, telephone calls, data communications, camera operations, and recording operations. The processing component 802 can include one or more processors 820 to execute instructions.

The memory 804 is configured to store executable instructions of the processor 820.

The processor 820 is configured to execute when (in response to determining that) a first data packet sent by a sending end is received by a receiving end, recording a receiving time of the first data packet, acquiring a sending time of the first data packet at the sending end, and determining a delay duration of the first data packet according to the receiving time and the sending time. The processor 820 is configured to execute determining a receiving speed of the first data packet at the receiving end. The processor 820 is configured to execute determining first data volume according to a plurality of second data packets received by the receiving end, in which the second data packets are sent by the sending end after sending the first data packet, and before the first data packet is received by the receiving end. The processor 820 is configured to execute determining a type of the network delay according to the first data volume, the delay duration of the first data packet, and the receiving speed. The type of the network delay is inherent delay or congestion delay. The processor 820 is configured to execute sending a determination result or an adjustment instruction generated according to the determination result to the sending end, so that the sending end adjusts a sending rate.

In some arrangements, the processor 820 is configured to execute: determining second data volume according to a plurality of third data packets received by the receiving end, the plurality of third data packets being received within a preset duration before the first data packet is received by the receiving end. The processor 820 is configured to execute determining the receiving speed according to the second data volume and the preset duration.

In some arrangements, the processor 820 is configured to execute: determining a type of network delay when (in response to determining that) the first data packet is received according to the first data volume, the delay duration of the first data packet, and the receiving speed, so as to obtain a preliminary determination result. The processor 820 is configured to execute storing the preliminary determination result into a determination set, wherein the determination set includes a preliminary determination result of a type of network delay when (in response to determining that) a fourth data packet is received by the receiving end, wherein the fourth data packet is received before the first data packet is received; The processor 820 is configured to execute when (in response to determining that) the number of preliminary determination results in the determination set is greater than or equal to a first preset threshold, calculating a ratio of the number of the preliminary determination results as the inherent delay to a total number of preliminary determination results in the determination set, and determining the type of network delay according to the ratio. The processor 820 is configured to execute when (in response to determining that) the number of preliminary determination results in the determination set is less than the first preset threshold, determining the type of network delay as the congestion delay.

In some arrangements, the processor 820 is configured to execute: determining whether the first data volume $inflight_n$, the delay duration $delay_n$ of the first data packet, and the receiving speed $r_n^{recv}$ satisfy an inequality: $(delay_n-\Delta)*r_n-$ $^{recv} \geq \text{inflight}_n$, where $\Delta$ is a second preset threshold. The processor 820 is configured to execute when (in response to determining that) the inequality holds, determining that the preliminary determination result of the type of network delay when (in response to determining that) the first data packet is received is the inherent delay. The processor 820 is configured to execute when (in response to determining that) the inequality does not hold, determining that the preliminary determination result of the type of network delay when (in response to determining that) the first data packet is received is the congestion delay.

In some arrangements, the processor 820 is configured to execute: when (in response to determining that) the ratio is greater than or equal to a third preset threshold, determining the type of network delay as the inherent delay. The processor 820 is configured to execute when (in response to determining that) the ratio is less than the third preset threshold, determining the type of network delay as the congestion delay.

In some arrangements, the processor 820 is configured to execute: if the determination result is the inherent delay, sending the determination result or the adjustment instruction generated according to the determination result to the sending end, so that the sending end maintains or increases the sending rate. The processor 820 is configured to execute if the determination result is the congestion delay, sending the determination result or the adjustment instruction generated according to the determination result to the sending end, so that the sending end decreases the sending rate.

In addition, the processing component 802 can include one or more modules to facilitate the interaction between the processing component 802 and other components. For example, the processing component 802 can include a multimedia module to facilitate the interaction between the multimedia component 808 and the processing component 802.

The memory 804 is configured to store various types of data to support the operation of the device 800. Examples of such data include instructions for any application or method operated on the electronic device 800, such as the contact data, the phone book data, messages, pictures, videos, and the like. The memory 804 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 806 provides power to various components of the electronic device 800. The power component 806 can include a power management system, one or more power sources, and other components associated with the generation, management, and distribution of power in the electronic device 800.

The multimedia component 808 includes a screen providing an output interface between the electronic device 800 and the user. In some arrangements, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some arrangements, the multimedia component 808 includes a front camera and/or a rear camera. When the device 800 is in an operation mode, such as a photographing mode or a video mode, the front camera and/or the rear camera can receive external multimedia data. Each of the front camera and the rear camera may be a fixed optical lens system or have focus and optical zoom capability.

The audio component 810 is configured to output and/or input an audio signal. For example, the audio component 810 includes a microphone (MIC) configured to receive an external audio signal when the electronic device 800 is in an operation mode, such as a call mode, a recording mode, and a voice recognition mode. The received audio signal may be further stored in the memory 804 or sent via the communication component 816. In some arrangements, the audio component 810 also includes a speaker for outputting the audio signal.

The I/O interface 812 provides an interface between the processing component 802 and peripheral interface modules, such as a keyboard, a click wheel, buttons, and the like. These buttons may include, but are not limited to, a home button, a volume button, a starting button, and a locking button.

The sensor component 814 includes one or more sensors for providing status assessments of various aspects of the electronic device 800. For example, the sensor component 814 can detect an open/closed status of the device 800, relative positioning of components, such as the display and the keypad of the electronic device 800. The sensor component 814 can also detect a change in position of one component of the electronic device 800 or the electronic device 800, the presence or absence of user contact with the electronic device 800, an orientation, or an acceleration/deceleration of the electronic device 800, and a change in temperature of the electronic device 800. The sensor component 814 can include a proximity sensor configured to detect the presence of nearby objects without any physical contact. The sensor component 814 can also include a light sensor, such as a CMOS or CCD image sensor, configured to use in imaging applications. In some arrangements, the sensor component 814 can also include an accelerometer sensor, a gyroscope sensor, a magnetic sensor, a pressure sensor, or a temperature sensor.

The communication component 816 is configured to facilitate wired or wireless communication between the electronic device 800 and other devices. The electronic device 800 can access a wireless network based on a communication standard, such as WiFi, an operator network (such as 2G 3G 4G or 5G), or a combination thereof. In an exemplary arrangement, the communication component 816 receives broadcast signals or broadcast associated information from an external broadcast management system via a broadcast channel. In an exemplary arrangement, the communication component 816 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary arrangement, the electronic device 800 may be implemented with one or more application specific integrated circuits (ASICs), digital signal processors (DSPs), digital signal processing devices (DSPDs), programmable logic devices (PLDs), field programmable Gate array (FPGA), controllers, microcontrollers, microprocessors or other electronic components to perform the above method.

In an exemplary arrangement, there is also provided a non-transitory computer-readable storage medium including instructions, such as a memory 804 including instructions executable by the processor 820 of the electronic device 800 to perform the above described method. For example, the non-transitory computer readable storage medium may be a ROM, a random access memory (RAM), a CD-ROM, a magnetic tape, a floppy disc, and an optical data storage device.

Figure 5:
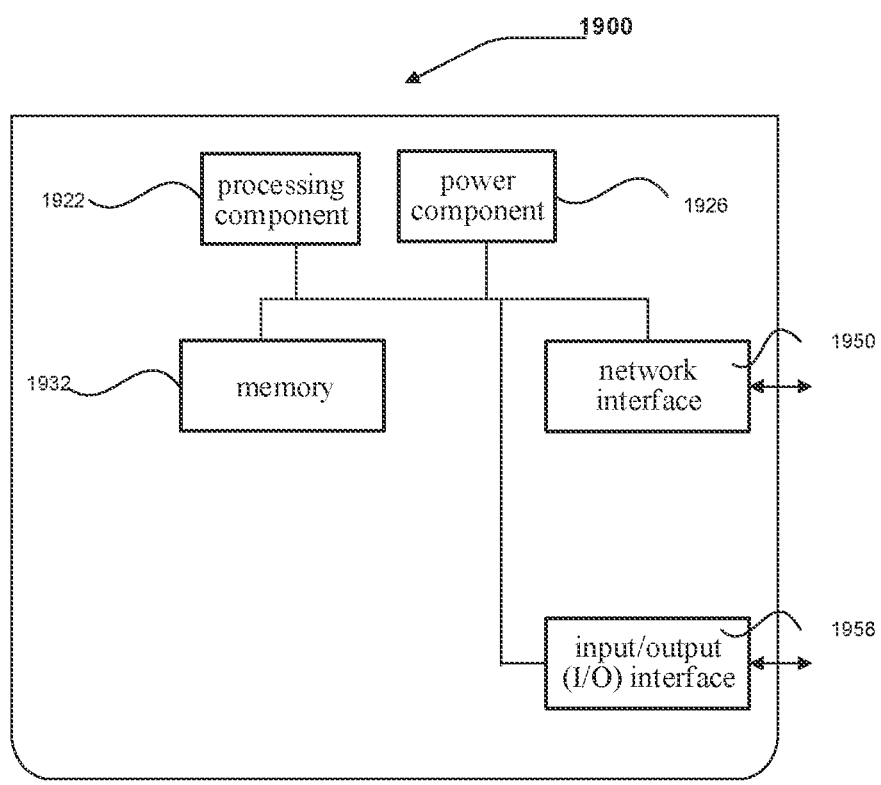
FIG. 5 is a block diagram of an electronic device shown in the present application.

FIG. 5 is a block diagram of an electronic device 1900 shown in the present application. For example, the electronic device 1900 may be provided as a server.

Referring to FIG. 5, the electronic device 1900 includes a processing component 1922 which further includes the one or more processors, and a memory resource represented by a memory 1932 for storing the instructions, such as the application, executable by the processing component 1922. The application stored in the memory 1932 may include one or more modules, and each module corresponds to one group of the instructions. In addition, the processing component 1922 is configured to execute the instructions to execute the foregoing method.

The electronic device 1900 may also include a power component 1926 configured to carry out power management for the electronic device 1900, a wired or wireless network interface 1950 configured to connect the electronic device 1900 with a network, and an input/output (I/O) interface 1958. The electronic device 1900 may operate an operating system stored in the memory 1932, such as Windows Server™, Mac OS X™, Unix™ Linux™, FreeBSD™ or the like.

Other implementation solutions of the disclosure will be apparent to those skilled in the art from consideration of the specification and practice of the disclosure disclosed herein. The disclosure is intended to cover any variations, uses, or adaptations of the disclosure following the general principles of the disclosure and including common general knowledge or customary technical means in the art not disclosed in the disclosure. The specification and arrangements are considered as exemplary only, and a true scope and spirit of the disclosure are indicated by the following claims.

What is claimed is:

1. A method for controlling a network delay, comprising:
   recording a receiving time of a first data packet in response to sending end sending a first data packet to a receiving end;
   acquiring a sending time of the first data packet at the sending end;
   determining a delay duration of the first data packet according to the receiving time and the sending time;
   determining a receiving speed of the first data packet at the receiving end;
   determining a first data volume according to a plurality of second data packets received by the receiving end, wherein the second data packets are sent by the sending end after sending the first data packet, and before the first data packet is received by the receiving end;
   determining a type of a network delay according to the first data volume, the delay duration of the first data packet, and the receiving speed, wherein the type of the network delay is inherent delay or congestion delay; and
   sending a determination result or an adjustment instruction generated according to the determination result to the sending end, so that the sending end adjusts a sending rate, where said determining a type of the network delay according to the first data volume, the delay duration of the first data packet, and the receiving speed comprises:
   determining a type of network delay in response to the first data packet is received according to the first data volume, the delay duration of the first data packet, and the receiving speed, so as to obtain preliminary determination results;
   storing the preliminary determination results into a determination set, wherein the determination set comprises a type of network delay of the preliminary determination results in response to a fourth data packet is received by the receiving end, wherein the fourth data packet is received before the first data packet is received;
   calculating a ratio of a number of the preliminary determination results as the inherent delay to a total number of preliminary determination results in the determination set, and determining the type of network delay according to the ratio, in response to determining that the number of preliminary determination results in the determination set is greater than or equal to a first preset threshold; and
   determining the type of network delay as the congestion delay in response to determining that the number of preliminary determination results in the determination set is less than the first preset threshold.

2. The method according to claim 1, where said determining a receiving speed of the first data packet at the receiving end comprises:
   determining a second data volume according to a plurality of third data packets received by the receiving end, the plurality of third data packets being received within a preset duration before the first data packet is received by the receiving end; and
   determining the receiving speed according to the second data volume and the preset duration.

3. The method according to claim 1, where said determining a type of network delay in response to determining that the first data packet is received according to the first data volume, the delay duration of the first data packet, and the receiving speed so as to obtain preliminary determination results comprises:
   determining whether the first data volume inflight$_n$, the delay duration delay$_n$ of the first data packet, and the receiving speed $r_n^{recv}$ satisfy an inequality: $(\text{delay}_n - \Delta) * r_n^{recv} \geq \text{inflight}_n$, where $\Delta$ is a second preset threshold;
   determining that the type of network delay of the preliminary determination results in response to determining that the first data packet is received is the inherent delay when the inequality holds;
   determining that the type of network delay of the preliminary determination results in response to determining that the first data packet is received is the congestion delay when the inequality does not hold.

4. The method according to claim 1, said determining the type of network delay according to the ratio comprises:
   determining the type of network delay as the inherent delay in response to determining that the ratio is greater than or equal to a third preset threshold; and
   determining the type of network delay as the congestion delay in response to determining that the ratio is less than the third preset threshold.

5. The method according to claim 1, where said sending a determination result or an adjustment instruction generated according to the determination result to the sending end so that the sending end adjusts a sending rate comprises:

sending the determination result or the adjustment instruction generated according to the determination result to the sending end in response to determining that the determination result is the inherent delay, so that the sending end maintains or increases the sending rate; and sending the determination result or the adjustment instruction generated according to the determination result to the sending end in response to determining that the determination result is the congestion delay, so that the sending end decreases the sending rate.

6. An electronic device, comprising:
a processor;
a memory for storing processor executable instructions;
wherein, the processor is configured to execute:
recording a receiving time of the first data packet in response that a first data packet sent by a sending end is received by a receiving end;
acquiring a sending time of the first data packet at the sending end;
determining a delay duration of the first data packet according to the receiving time and the sending time;
determining a receiving speed of the first data packet at the receiving end;
determining a first data volume according to a plurality of second data packets received by the receiving end, wherein the second data packets are sent by the sending end after sending the first data packet, and before the first data packet is received by the receiving end;
determining a type of a network delay according to the first data volume, the delay duration of the first data packet, and the receiving speed, wherein the type of the network delay is inherent delay or congestion delay; and
sending a determination result or an adjustment instruction generated according to the determination result to the sending end, so that the sending end adjusts a sending rate,
wherein the processor is configured to execute:
determining a type of network delay in response to determining that the first data packet is received according to the first data volume, the delay duration of the first data packet, and the receiving speed, so as to obtain preliminary determination results;
storing the preliminary determination results into a determination set, wherein the determination set comprises a type of network delay of the preliminary determination results in response to determining that a fourth data packet is received by the receiving end, wherein the fourth data packet is received before the first data packet is received;
calculating a ratio of a number of the preliminary determination results as the inherent delay to a total number of preliminary determination results in the determination set, and determining the type of network delay according to the ratio, in response to determining that the number of preliminary determination results in the determination set is greater than or equal to a first preset threshold; and
determining the type of network delay as the congestion delay in response to determining that the number of preliminary determination results in the determination set is less than the first preset threshold.

7. The electronic device according to claim 6, wherein the processor is configured to execute:
determining a second data volume according to a plurality of third data packets received by the receiving end, the plurality of third data packets being received within a preset duration before the first data packet is received by the receiving end; and
determining the receiving speed according to the second data volume and the preset duration.

8. The electronic device according to claim 6, wherein the processor is configured to execute:
determining whether the first data volume inflight$_n$, the delay duration delays of the first data packet, and the receiving speed $r_n^{recv}$ satisfy an inequality: (delay$_n$–$\Delta$)*$r_n^{recv}$≥inflight$_n$, where $\Delta$ is a second preset threshold;
determining that the type of network delay of the preliminary determination results in response to determining that the first data packet is received is the inherent delay when the inequality holds;
determining that the type of network delay of the preliminary determination results in response to determining that the first data packet is received is the congestion delay when the inequality does not hold.

9. The electronic device according to claim 6, wherein the processor is configured to execute:
determining the type of network delay as the inherent delay in response to determining that the ratio is greater than or equal to a third preset threshold; and
determining the type of network delay as the congestion delay in response to determining that the ratio is less than the third preset threshold.

10. The electronic device according to claim 6, wherein the processor is configured to execute:
sending the determination result or the adjustment instruction generated according to the determination result to the sending end in response to determining that the determination result is the inherent delay, so that the sending end maintains or increases the sending rate;
sending the determination result or the adjustment instruction generated according to the determination result to the sending end in response to determining that the determination result is the congestion delay, so that the sending end decreases the sending rate.

11. A non-transitory computer-readable storage medium, wherein instructions in the storage medium, when executed by a processor of an electronic device, causes the electronic device to execute the method for controlling a network delay, comprising:
recording a receiving time of the first data packet in response that a first data packet sent by a sending end is received by a receiving end;
acquiring a sending time of the first data packet at the sending end;
determining a delay duration of the first data packet according to the receiving time and the sending time;
determining a receiving speed of the first data packet at the receiving end;
determining a first data volume according to a plurality of second data packets received by the receiving end, wherein the second data packets are sent by the sending end after sending the first data packet, and before the first data packet is received by the receiving end;
determining a type of a network delay according to the first data volume, the delay duration of the first data packet, and the receiving speed, wherein the type of the network delay is inherent delay or congestion delay; and
sending a determination result or an adjustment instruction generated according to the determination result to the sending end, so that the sending end adjusts a sending rate, where said determining a type of the network delay according to the first data volume, the delay duration of the first data packet, and the receiving speed comprises:

determining a type of network delay in response to the first data packet is received according to the first data volume, the delay duration of the first data packet, and the receiving speed, so as to obtain preliminary determination results;

storing the preliminary determination results into a determination set, wherein the determination set comprises a type of network delay of the preliminary determination results in response to a fourth data packet is received by the receiving end, wherein the fourth data packet is received before the first data packet is received;

calculating a ratio of a number of the preliminary determination results as the inherent delay to a total number of preliminary determination results in the determination set, and determining the type of network delay according to the ratio, in response to determining that the number of preliminary determination results in the determination set is greater than or equal to a first preset threshold; and determining the type of network delay as the congestion delay in response to determining that the number of preliminary determination results in the determination set is less than the first preset threshold.

12. The electronic device according to claim 10, wherein the instructions further causes the electronic device to execute:

determining a second data volume according to a plurality of third data packets received by the receiving end, the plurality of third data packets being received within a preset duration before the first data packet is received by the receiving end; and determining the receiving speed according to the second data volume and the preset duration.

13. The electronic device according to claim 12, wherein the instructions further causes the electronic device to execute:

determining whether the first data volume inflight$_n$, the delay duration delay$_n$ of the first data packet, and the receiving speed $r_n^{recv}$ satisfy an inequality: (delay$_n$−Δ) *$r_n^{recv}$≥inflight$_n$, where Δ is a second preset threshold;

determining that the type of network delay of the preliminary determination results in response to determining that the first data packet is received is the inherent delay when the inequality holds;

determining that the type of network delay of the preliminary determination results in response to determining that the first data packet is received is the congestion delay when the inequality does not hold.

14. The electronic device according to claim 12, wherein the instructions further causes the electronic device to execute:

determining the type of network delay as the inherent delay in response to determining that the ratio is greater than or equal to a third preset threshold; and determining the type of network delay as the congestion delay in response to determining that the ratio is less than the third preset threshold.

15. The electronic device according to claim 10, wherein the instructions further causes the electronic device to execute:

sending the determination result or the adjustment instruction generated according to the determination result to the sending end in response to determining that the determination result is the inherent delay, so that the sending end maintains or increases the sending rate;

sending the determination result or the adjustment instruction generated according to the determination result to the sending end in response to determining that the determination result is the congestion delay, so that the sending end decreases the sending rate.

* * * * *